(12) United States Patent  
Burchard et al.

(10) Patent No.: US 7,006,974 B2  
(45) Date of Patent: Feb. 28, 2006

(54) VOICE CONTROLLER AND VOICE-CONTROLLER SYSTEM HAVING A VOICE-CONTROLLER APPARATUS

(75) Inventors: Bernd Burchard, Ottobrunn (DE); Lothar Armbrecht, München (DE)

(73) Assignee: Micronas GmbH, Munich (DE)

( * ) Notice: Subject to any disclaimer, the term of this patent is extended or adjusted under 35 U.S.C. 154(b) by 380 days.

(21) Appl. No.: 09/767,800

(22) Filed: Jan. 22, 2001

(65) Prior Publication Data

US 2001/0039494 A1 Nov. 8, 2001

(30) Foreign Application Priority Data

Jan. 20, 2000 (DE) ................. 100 02 321

(51) Int. Cl.
*G10L 15/00* (2006.01)
(52) U.S. Cl. ................. 704/275; 348/14.05
(58) Field of Classification Search ............. 704/270, 704/275, 246, 233; 348/14.05, 734
See application file for complete search history.

(56) References Cited

U.S. PATENT DOCUMENTS 5,267,323 A 11/1993 Kimura
5,774,859 A * 6/1998 Houser et al. ............. 704/275
6,513,006 B1 * 1/2003 Howard et al. ............ 704/275
6,584,439 B1 * 6/2003 Geilhufe et al. ........... 704/270
6,606,280 B1 * 8/2003 Knittel ..................... 704/275
6,721,701 B1 * 4/2004 Goss et al. ................ 704/231

OTHER PUBLICATIONS

English abstract of previously filed German Published Non-Prosecuted Patent Application DE 197 48 267 A1, dated Jun. 17, 1999.

* cited by examiner

*Primary Examiner*—Daniel Abebe
(74) *Attorney, Agent, or Firm*—Laurence A. Greenberg; Werner H. Stemer; Ralph E. Locher

(57) ABSTRACT

A voice controller controls a voice-controlled apparatus, such as a television set, and includes a receiver for receiving sound information from a corresponding transmitter, which is associated with at least one sound source, for example an amplifier or the television set itself. A processor coupled to a microphone and the receiver corrects the sound signal registered by the microphone in accordance with the sound information received by the receiver in order to eliminate a component of the sound signal corresponding to the sound information. The sound signal corrected in this way is subjected to voice recognition.

18 Claims, 1 Drawing Sheet

VOICE CONTROLLER AND VOICE-CONTROLLER SYSTEM HAVING A VOICE-CONTROLLER APPARATUS

BACKGROUND OF THE INVENTION

FIELD OF THE INVENTION

The present invention relates to a voice controller utilizing a sound detector detecting a sound signal containing a voice command and to a system including such a voice-controlled apparatus.

Human speech is an expedient way to control television sets or other items of electronic entertainment equipment. Using voice-controlled man-machine interfaces provide many advantages including simpler operation of the respective item of equipment for the user. Therefore, retrofitting a voice control system is particularly beneficial to existing equipment that needs a voice control option.

The problem with using voice control of audio equipment is that the sound or audio signal produced by the equipment (typically a loudspeaker) is mixed with the spoken voice command and thus superimposed over the latter. This overlap worsens the recognizablity of the voice command for the voice recognition system. The same also applies to external sound sources, whose noise or audio signals can be superimposed on the voice command of the user. If, for example, a television set is to be voice controlled, and if a stereo system or the like in the same room is switched on, the voice command (the signal) is considerably less recognizable because the audio signals produced by the stereo system (the noise) are superimposed over the spoken command of the user. The unknown interfering noises added to the voice command creates a resulting sound signal that exhibits a relatively poor signal-to-noise ratio in the resulting sound signal. The resulting sound signal is supplied to the voice recognition system of the voice-controlled item of equipment where the resulting sound signal is to be converted into a corresponding control signal. The poor signal-to-noise ratio inhibits the conversion.

SUMMARY OF THE INVENTION

It is accordingly an object of the invention to provide a voice-controller and a voice-controller system having a voice-controlled apparatus that overcomes the hereinafore-mentioned disadvantages of the heretofore-known devices of this general type and that ensures the recognizability of a voice command with a sufficiently good signal-to-noise ratio, even in the presence of a sound source whose sound signal is superimposed over the voice command.

With the foregoing and other objects in view, there is provided, in accordance with the invention, a voice controller including a sound source, a sound detector, a receiver, and a sound signal processor. The sound source includes a transmitter. The sound detector detects a sound signal containing a voice command. The sound detector has a voice recognizer recognizing the voice command. The sound detector converts the voice command into a corresponding control signal for a voice-controlled apparatus. A receiver receives sound information from the transmitter associated with the sound source. A sound signal processor coupled to the sound detector and the receiver. The sound signal processor corrects the sound signal by eliminating the sound information from the sound signal to produce a corrected sound signal, and supplies the corrected sound signal to the voice recognizer for evaluation.

In accordance with another feature of the invention, the sound detector, the receiver, the sound signal processor, and the voice recognizer are arranged in a mobile part provided separately from said voice-controlled apparatus.

In accordance with another feature of the invention, the voice-controlled apparatus includes a voice-controller receiver, and the mobile part has a transmitter transmitting the corresponding control signal to the voice-controller receiver.

In accordance with another feature of the invention, the transmitter of the mobile part communicates with the voice-controller receiver via a wireless communication channel.

In accordance with another feature of the invention, the sound signal processor determines a degree of correlation between the sound signal detected by the sound detector and a sound signal corresponding to the sound information. The sound signal processor determines an acoustic delay between the sound signal detected by the sound detector and a sound signal corresponding to the sound information. The sound signal processor corrects the sound signal detected by said sound detector while accounting for the acoustic delay.

In accordance with another feature of the invention, the sound signal processor determines the degree of correlation between the sound signal detected by cross-correlating the sound detector and the sound signal corresponding to the sound information.

In accordance with another feature of the invention, the sound signal processor subtracts the sound signal corresponding to the sound information from the sound signal detected by the sound detector, while accounting for the determined acoustic delay, to obtain a corrected sound signal to be supplied to the sound signal processor.

In accordance with another feature of the invention, the sound detector includes a number of microphones that are coupled to one another. The microphones have an acoustic phase shift between them. And, the sound detector accounts for the acoustic phase shift present between the number of microphones.

In accordance with another feature of the invention, the voice controller includes a keyboard in the sound detector. The keyboard programs the voice recognizer.

In accordance with another feature of the invention, the sound signal processor is associated with a number of sound sources, and the sound signal processor separately corrects for each of the number of sound sources.

With the objects of the invention in view, there is also provided a voice-controller system. The voice-controller system includes a voice controller as described above. In addition, the voice-controller system includes a receiver receiving sound information from a transmitter associated with a sound source, and a sound signal processor coupled to the sound detector and the receiver. The sound signal processor corrects the sound signal by eliminating the sound information from the sound signal to produce a corrected sound signal, and supplies the corrected sound signal to the voice recognizer for evaluation. The voice-controller system includes a sound source associated with a transmitter transmitting the sound information to the receiver of the voice-controlled apparatus. The sound information in each case describes the sound signal generated by the sound source.

In accordance with a further feature of the invention, the transmitter associated with the sound source communicates with the receiver associated with the voice-controlled apparatus via a wireless communication channel.

In accordance with a further feature of the invention, the wireless communication channel is an infrared channel. The wireless communication channel also can be a radio channel.

In accordance with a further feature of the invention, the voice-controlled apparatus itself belongs to the at least one sound source, so that the sound information transmitted by the transmitter to the receiver associated with the voice-controlled apparatus describes the sound signal generated by the voice-controlled apparatus at that instant.

In accordance with a further feature of the invention, the voice-controlled apparatus is an item of electronic entertainment equipment.

In accordance with a further feature of the invention, the at least one sound source is an item of electronic entertainment equipment.

According to the invention, the voice controller is assigned a receiver that receives sound information from transmitter that are associated with at least one sound source. This sound source can be, for example, a loudspeaker belonging to the apparatus itself or else loudspeakers belonging to other equipment. The voice controller according to the invention is accordingly preferably used in a system having at least one sound source. This sound source can be associated with transmitting means for transmitting the sound information to the receiving means of the voice controller. The sound information in each case describes the sound signal generated by the sound source at that instant.

The sound information is used to communicate, in particular, the pitch, loudness etc. of the audio or sound signal produced by the corresponding sound source at that instant.

The voice controller receives a voice command in the form of a sound signal. However, this sound signal is composed not only of the voice command but also of the surrounding noise. Usually, the surrounding noise is the audio signal produced by the sound source. Because the audio signal respectively generated at that instant is known to the voice controller, on account of the sound information, the sound signal registered by the voice controller can be corrected appropriately and freed of that component that corresponds to the audio signal from the sound source. The voice recognition is based only on the sound signal corrected or filtered in this way.

Because the corrected sound signal contains only still unknown interfering noise in addition to the voice command, the corrected sound signal has a considerably improved signal-to-noise ratio (S/N) as compared with the original sound signal.

The transmission of the sound information to the receiver associated with the voice controller can, in particular, be carried out in a wireless manner, for example via an infrared or radio channel.

It is particularly advantageous if these receivers are integrated into a mobile part (remote control) provided to operate the voice controller. Likewise, the sound signal processors that carry out the above-described correction or filtering of the sound signal including the voice command, and also the voice recognizer that carry out the subsequent voice recognition, can be integrated into the mobile part. Then, by means of voice recognition, the voice recognizer generate a control signal that corresponds to the corrected sound signal and that, for example, is transmitted to the voice controller via an infrared transmitter. However, the receiver and the sound signal processor can be located in the voice controller itself.

The present invention is generally suitable for the voice control of apparatus of any desired configuration, in particular for the voice control of electronics entertainment equipment, such as stereo systems or television sets.

Other features that are considered as characteristic for the invention are set forth in the appended claims.

Although the invention is illustrated and described herein as embodied in a voice controller and voice-controller system having such a voice-controlled apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
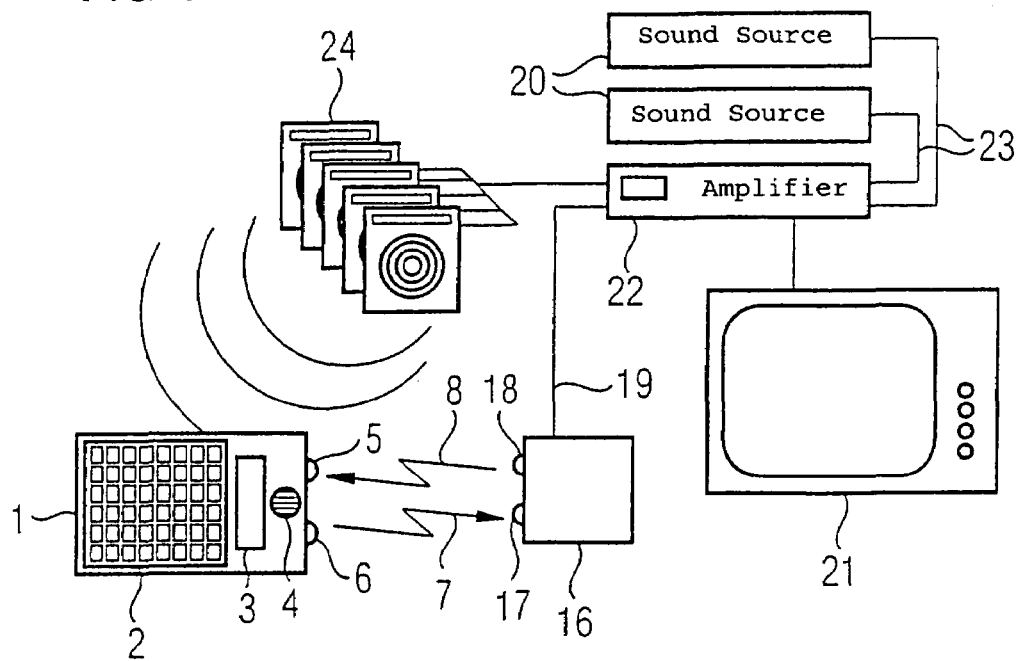
FIG. 1 is a diagrammatic view showing a voice controller according to the invention in a system having a number of sound sources.

In all the figures of the drawing, sub-features and integral parts that correspond to one another bear the same reference symbol in each case.

Referring now to the figures of the drawings in detail and first, particularly to FIG. 1 thereof, there is shown a stereo system having an amplifier 22 and a number of loudspeakers 24. Various audio or sound sources 20, such as a tuner, a cassette deck, a DAT device, or a video recorder, are connected to the amplifier 22 via connecting leads 23. In addition, in the example illustrated, a television set 21 is connected to the amplifier 22.

An additional device 16 is connected to the amplifier 22 via a connecting lead 19. The additional device 16 also can be integrated in one of the items of equipment illustrated. The audio signals generated by the entire system, that is to say the television set 21 and the stereo system 20, 23, are received by the additional device 16 via the connecting lead 19, are mixed together, encoded and/or modulated and converted into corresponding analogue or digital sound or audio information which, with the aid of a transmitter 18, is transmitted via a transmission channel 8 to a corresponding receiver 5 of a remote control 1. The transmission channel 8 can be, in particular, an infrared or radio channel, for example one meeting the Bluetooth mobile radio standard. On the other hand, control information for the operation of the television set 21 or the stereo system 20, 22, 23 is transmitted to a receiver 17 of the additional device 16 by a transmitter 6 in the remote control 1 via a transmission channel 7. The additional device 16 is therefore connected bidirectionally to the remote control 1.

Figure 2:
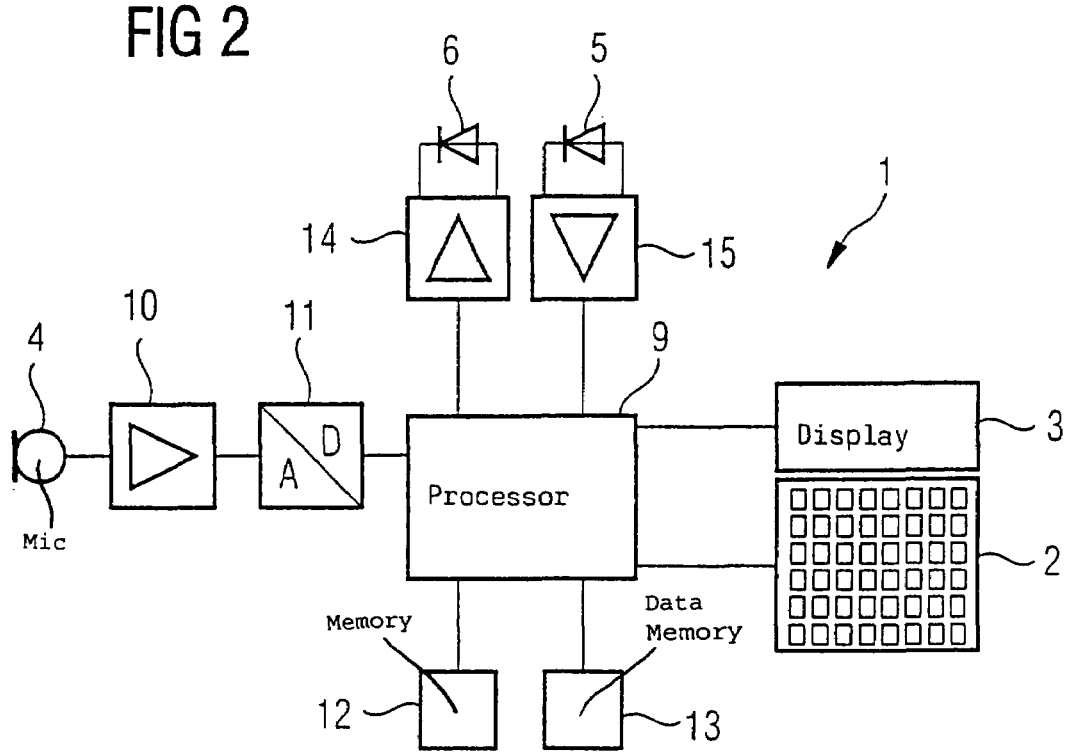
FIG. 2 is a schematic view depicting the construction of the remote control shown in FIG. 1.

FIG. 2 shows the remote control 1. The remote control 1 includes, for the case of infrared transmission, an IR receiving diode as receiver 5 with an IR receiver amplifier/IR converter 15 connected downstream that supplies the sound information received from the additional device to a processor 9.

In addition, the remote control 1 includes at least one microphone 4. The microphone 4 picks up the sound signal respectively acting on the remote control at that instant. The sound signal that is picked up by the microphone 4 contains a voice command from a user. An example of a voice command could be to activate the television set 21 or the stereo system 20, 22, 23. Then, the sound signal is supplied via one or more receiving amplifiers 10 to an analogue/digital converter 11 and thus digitized. The digitized sound signal is finally supplied to the processor 9 for voice recognition.

The operation of the processor 9 is carried out on the basis of a program stored in a program memory 12. The digitized data from the analogue/digital converter 11 are stored in a data memory 13 that also can be wholly or partially identical to the program memory 12.

Before carrying out the voice recognition, the processor 9 corrects the sound signal picked up by the microphone 4. The correction is made on the basis of the received sound or audio information from the additional device 16. For example, the processor 9 can attempt, initially by cross-correlation, to determine the degree of correlation between the sound signal picked up by the microphone 4 and the audio signals corresponding to the sound information from the additional device 16. In accordance with the correlation coefficients determined in this way, and the acoustic delay that can be derived between the sound signal from the microphone 4 and the audio signals corresponding to the sound information from the additional device 16, the sound signal picked up by the microphone 4 is then corrected or filtered in order to eliminate the contribution of the audio signals corresponding to the sound information. In this case, each audio signal from the individual sound sources is subtracted from the sound signal from the microphone 4. As shown in FIG. 1, in the case of a 5-channel multi-channel sound amplifier 22 such as those sold under the trademark DOLBY SURROUND®, five separate audio signals are accordingly described by the sound information transmitted by the additional device 16 and subsequently have to be subtracted separately by the processor 9 from the sound signal from the microphone 4. Through this subtraction, only a sound signal in which the audio signals corresponding to the sound information have been suppressed remains. Therefore, a voice command contained in the filtered or corrected sound signal is only still distorted by an error component consisting of predominantly unknown interfering noise.

The processor 9 then subjects the sound signal conditioned in this way to a voice recognition algorithm (for example HMM (Hidden Markov Model) or DTW (Dynamic Time Warping)). These algorithms compare the digitized and corrected sound signal with predefined patterns. If the agreement in accordance with the algorithm respectively used is adequate to designate a pattern as identified, a process associated with the recognized pattern is started in the processor 9, as a result of which, a predefined control command is transmitted to the additional device 16 via a transmitter amplifier 14 and an IR transmitting diode 6. In this case, this may be a predefined IR pulse train that has previously been programmed into the remote control 1.

Instead of only one microphone 4, the use of a number of microphones 4 is also conceivable. These microphones can be coupled to one another, for example, by evaluating the acoustic phase shift present between these microphones. This coupling can be carried out both before and after the correction or filtering of the sound signal. Through coupling, the physical range from which an acoustic input is intended to be permissible can be restricted accordingly.

If already existing items of equipment or systems with remote control are to be expanded by a voice recognition function, or a voice recognition function already present in the remote control 1 is to be programmed, the control commands generated by the remote control 1 should be placed into a relationship with the corresponding voice commands. To this end, the remote control 1 can be changed into a learning mode. Learning mode on the remote control 1 can be entered, for example, by pressing a button on the keyboard 2 of the remote control or a voice command (if this can already be recognized). Subsequently, a desired control function of the remote control 1 is selected, and the user is requested, for example via a small LCD display 3 on the remote control, to input a suitable speech pattern. The input of the speech pattern can then be carried out by means of repeated recitation and recording of the voice command, by using a so-called say-in tool on the remote control 1, by inputting a phoneme sequence via the keyboard 2 or by selecting predefined words and combinations thereof to form the desired voice command, and so on. The input can be terminated by pressing the button again or by a suitable voice command.

In the example shown in FIG. 1, the additional device 16 and the loudspeakers 24 are provided jointly for the television set 21 and the stereo system 20, 22. However, the individual sound sources can be operated with respectively individual loudspeakers and/or individual additional devices 16. In this case, each additional device transmits to the remote control 1 only sound information relating to the audio or sound signal produced by the corresponding sound source at that instant, and only the control commands or control information determined by the remote control 1 for the corresponding sound source being evaluated.

We claim:

1. A voice controller for a voice-controlled apparatus having a voice-controlled receiver, comprising:
    a sound source with a transmitter for transmitting sound information being obtained from audio signals of the sound source being mixed together encoded and/or modulated and converted into the sound information;
    a sound detector detecting a sound signal containing a voice command, said sound detector having a voice recognizer recognizing the voice command, and said sound detector converting the voice command into a corresponding control signal for the voice-controlled apparatus;
    a receiver receiving sound information from said transmitter associated with said sound source;
    a sound signal processor coupled to said sound detector and said receiver, said sound signal processor correcting the sound signal by eliminating the sound information from the sound signal to produce a corrected sound signal, and supplying the corrected sound signal to said voice recognizer for evaluation;
    said sound detector, said receiver, said sound signal processor, and said voice recognizer being disposed in a mobile part provided separately from the voice-controlled apparatus;
    said mobile part having a transmitter transmitting the corresponding control signal to the voice-controller receiver; and
    said transmitter of said mobile part communicating with the voice-controller receiver by a wireless communication channel.

2. The voice controller according to claim 1, wherein said sound signal processor determines a degree of correlation between the sound signal detected by the sound detector and a sound signal corresponding to the sound information, said sound signal processor determines an acoustic delay between the sound signal detected by the sound detector and a sound signal corresponding to the sound information, and said sound signal processor corrects the sound signal detected by said sound detector while accounting for the acoustic delay.

3. The voice controller according to claim 2, wherein said sound signal processor determines the degree of correlation between the sound signal detected by cross-correlating the sound detector and the sound signal corresponding to the sound information.

4. The voice controller according to claim 2, wherein said sound signal processor subtracts the sound signal corresponding to the sound information from the sound signal detected by the sound detector, while accounting for the determined acoustic delay, to obtain a corrected sound signal to be supplied to the sound signal processor.

5. The voice controller according to claim 1, wherein said sound detector includes a number of microphones that are coupled to one another, the microphones having an acoustic phase shift between them, and said sound detector accounting for the acoustic phase shift present between the number of microphones.

6. The voice controller according to claim 1, including:
a keyboard in said sound detector, said keyboard programming said voice recognizer.

7. The voice controller according to claim 1, wherein said sound signal processor is associated with a number of sound sources, and said sound signal processor separately corrects for each of the number of sound sources.

8. A voice-controller system, comprising:
a voice-controlled apparatus having a voice-controller receiver;
a voice-controller having:
a sound source with a transmitter for transmitting sound information being obtained from audio signals of the sound source being mixed together encoded and/or modulated and converted into the sound information;
a sound detector detecting a sound signal containing a voice command, said sound detector having a voice recognizer recognizing the voice command, and said sound detector converting the voice command into a corresponding control signal for said voice-controlled apparatus;
a receiver receiving sound information from a transmitter associated with a sound source; and
a sound signal processor coupled to said sound detector and said receiver, said sound signal processor correcting the sound signal by eliminating the sound information from the sound signal to produce a corrected sound signal, and supplying the corrected sound signal to said voice recognizer for evaluation;
said sound detector, said receiver, said sound signal processor, and said voice recognizer being disposed in a
mobile part provided separately from said voice-controlled apparatus;
said mobile part having a transmitter transmitting the corresponding control signal to said voice-controller receiver;
said transmitter of said mobile part communicating with said voice-controller receiver by a wireless communication channel; and
a sound source associated with said transmitter transmitting the sound information to said receiver of said voice-controller, the sound information in each case describing the sound signal generated by the sound source.

9. The voice controller system according to claim 8, wherein said transmitter associated with said sound source communicates with said receiver associated with said voice-controller via said wireless communication channel.

10. The voice controller system according to claim 9, wherein said wireless communication channel is an infrared channel.

11. The voice controller system according to claim 9, wherein said wireless communication channel is a radio channel.

12. The voice controller system according to claim 8, wherein said voice-controller itself belongs to said sound source, so that the sound information transmitted by said transmitter to said receiver associated with said voice controller describes the sound signal generated by said voice-controller at that instant.

13. The voice controller system according to claim 8, wherein the voice-controlled apparatus is an item of electronic entertainment equipment.

14. The voice controller system according to claim 8, wherein said sound source is an item of electronic entertainment equipment.

15. A method of signal transmission between a sound source and a voice-controlled receiver for a voice-controlled apparatus, comprising the steps of:
transmitting sound information obtained from audio signals of the sound source being mixed together, encoded and/or modulated and converted into sound information;
detecting by a sound detector a sound signal containing a voice command, recognizing by a voice recognizer the voice command, and converting the voice command into a corresponding control signal for the voice-controlled apparatus;
receiving the sound information from a transmitter associated with the sound source; and
correcting the sound signal with a sound signal processor coupled with the sound detector by eliminating the sound information from the sound signal to produce a corrected sound signal, and supplying the corrected sound signal to the voice recognizer for evaluation.

16. The method of signal transmission of claim 15, further including the step of placing the sound detector, the receiver, the sound signal processor, and the voice recognizer in a mobile part provided separately from the voice-controlled apparatus.

17. The method of signal transmission of claim 16, further including the step of transmitting the corresponding control signal to the voice-controller receiver with a transmitter of the mobile part.

18. The method of signal transmission of claim 17, further including the step of communicating between the transmitter of the mobile part and the voice-controller receiver by a wireless communication channel.

* * * * *